United States Patent [19]

Johansson

[11] Patent Number: 5,546,920
[45] Date of Patent: Aug. 20, 1996

[54] STARTING SYSTEM FOR INTERNAL COMBUSTION ENGINES WHICH CAN BE DRIVEN BY DIFFERENT FUELS

[75] Inventor: Anders Johansson, Enhörna, Sweden

[73] Assignee: Saab Automobile Aktiebolag, Sweden

[21] Appl. No.: 428,207

[22] PCT Filed: Nov. 17, 1993

[86] PCT No.: PCT/SE93/00982

§ 371 Date: May 17, 1995

§ 102(e) Date: May 17, 1995

[87] PCT Pub. No.: WO94/11630

PCT Pub. Date: May 26, 1994

[30] Foreign Application Priority Data

Nov. 18, 1992 [SE] Sweden .................. 9203451

[51] Int. Cl.⁶ .................. F02M 37/00; B60K 15/02
[52] U.S. Cl. .................. 123/685; 123/514; 137/571
[58] Field of Search .................. 123/510, 514, 123/685; 137/571, 574, 576

[56] References Cited

U.S. PATENT DOCUMENTS 5,197,444  3/1993  Lang et al. .................. 123/514
5,197,445  3/1993  Casari .................. 123/514

FOREIGN PATENT DOCUMENTS 3500718   7/1986  Germany .
4008372   9/1991  Germany .
91/04406  4/1991  WIPO .
91/17355  11/1991  WIPO .

OTHER PUBLICATIONS

Patent Abstracts of Japan, vol. 22, No. 263, M–619 abstract of JP, A, 62–68130 (Nissan Motor Co Ltd), 28 Mar. 1987.

*Primary Examiner*—Tony M. Argenbright
*Attorney, Agent, or Firm*—Ostrolenk, Faber, Gerb & Soffen, LLP

[57] ABSTRACT

An arrangement for the supply of fuel to internal combustion engines with different mixing ratios of methanol and petrol, and continuous transition during operation between different mixtures thereof which arrangement includes a main tank (2) and a slave tank (4), which slave tank must be isolated from the main tank so that its mixing ratio is not varied by filling, enabling the engine to be started on the same fuel as that on which it was stopped. The engine is supplied with fuel by a fuel pump (7) arranged in the slave tank (4), which fuel pump also drives an ejector (6) arranged in the main tank (2), so that fuel is entrained from the main tank (2) to the slave tank (4). Only one fuel pump (7) is therefore required. Because the ejector (6), in controlled dependence of the engine temperature, supplies the fuel to slave tank (4) through a rising pipe (20) which discharges above the highest fuel level in the slave tank (4) and the main tank (2) respectively, a safely isolated slave tank (4) is obtained during the warming up phase, followed by rapid mixing of the fuel in the slave tank (4) with the fuel present in the main tank (2).

4 Claims, 1 Drawing Sheet

STARTING SYSTEM FOR INTERNAL COMBUSTION ENGINES WHICH CAN BE DRIVEN BY DIFFERENT FUELS

BACKGROUND OF THE INVENTION

This invention relates to an arrangement for supplying fuel to internal combustion engines.

Several different systems have been presented to enable Otto engines to be operated with completely different fuels, such as pure methanol and pure petrol, and to allow a gradual transition, during continuous operation, from pure petrol operation, for example, to pure methanol operation, or a transition to different mixtures thereof. Such a gradual transition is obtained, for example, if the vehicle is stopped after having run the engine on pure petrol and the fuel tank thereafter filled with pure methanol. The fuel present in the main tank will then be a mixture of petrol left in the tank and the newly filled methanol. The problem that arises after filling, and possibly after a prolonged stationary period, is that the engine is started with a new fuel in the main tank which has a completely different fuel value to the fuel with which the engine was stopped. To ensure that the engine is able to be controlled so that the correct quantity of fuel is supplied and the emissions reduced, the use of different types of fuel sensors in the feed lines to the engine has been proposed. This enables the engine control unit to be set to the fuel quality currently supplied to the engine. However, these sensors are relatively expensive and are not very reliable.

Another solution has been proposed in WO 91/04406, in which the lambda sensor installed in the exhaust system can be used as a sensor for switching over the engine control unit. One problem here is that on starting, especially cold starting, the sensor will not reach its required operating temperature until the engine has been running for a few minutes. If, during this starting stage, the engine were to be supplied with a fuel with an entirely different fuel quality to that used before the engine was switched off, there would be a risk that the engine might discharge uncontrolled emissions and might even stop. In WO 91/04406 this problem has been solved by the use of a slave tank in which the fuel gradually undergoes controlled mixing with the fuel mixture present in the main tank, but not until the engine is restarted, and preferably after the lambda sensor has reached the required operating temperature. However, the concept proposed in WO 91/04406 requires two fuel pumps, one between the main tank and slave tank, and one between the slave tank and engine, which involves unnecessarily high costs because fuel pumps which are capable of withstanding both pure methanol and pure petrol are very expensive.

Solutions which are based on the concept proposed in WO 91/04406 have also been presented in DE 4008372, DE 4027947 and DE 4027948.

DE 4008372 differs essentially from WO 91/04406 in that a shutoff valve is installed between the main tank and slave tank. The valve does not open and fuel cannot be drawn from the main tank until the lambda sensor begins to operate. DE 4027947 differs essentially from WO 91/04406 in that a shifting valve shifts the suction side of the pump between the slave tank and the main tank. The slave tank is filled with the fuel returned from the fuel manifold, and as long as the engine is cold or the lambda sensor is not operating, the pump sucks from the slave tank. This solution has one disadvantage in that after the warming up phase the fuel is taken from the main tank and thereafter the slave tank begins to be mixed with the return fuel only. After the warming up phase the valve shifts and suddenly a different fuel quality is supplied to the engine. If the engine is capable of withstanding this changeover, the control unit is set to the fuel quality in the main tank. If the engine is switched off shortly afterwards, the engine will next be started on the slave tank, which may contain a completely different fuel mixture, giving rise to starting difficulties.

In one particular design, DE 4027948 differs essentially from WO 91/04406 in that an ejector technology, known from WO 91/17355, is applied for opening a pressure controlled valve in the slave tank. There is a risk here, however, that the seal of the pressure controlled valve may leak if particles stick to it, which can easily happen because the valve is located close to the bottom of the main tank and loosened deposits may block the valve seat. The spring loaded valve cone shown must be fitted with a relatively weak spring because the ejector pressure must be sufficient to open the valve. Another disadvantage is that the ejector begins to draw fuel from the main tank into the slave tank as soon as the engine is started. In the case of a cold start and at low engine speed this results in most of the fuel supplied from the fuel pump being fed to the ejector, since by this stage the engine is not drawing as much fuel. The consequence of this is rapid mixing in the slave tank. If the engine is only to be run at such short intervals that the lambda sensor does not have time to become operative, starting difficulties arise because a new mixing ratio will prevail in the slave tank, a mixing ratio which the control system has not had time to detect. In a second design in DE 4027948 a duplex pump concept is shown instead of the ejector solution.

SUMMARY OF THE INVENTION

The objective of this invention is to enable only one fuel pump to be used for alternating fuel supply, either from an isolated slave tank only, or from a slave tank in which fuel from a main tank is mixed with the fuel in the slave tank.

Another objective is to ensure that the volume of fuel in the slave tank is retained and that there is no risk that it will be drained back into the main tank, thereby guaranteeing that the maximum volume is always available for a first cold start after the engine has been run with an actively controlling lambda sensor.

A further objective is that of reliably isolating the slave tank from the main tank to prevent sediment and deposits entrained from the bottom of the main tank from maintaining the connection and subsequent mixing, although mixing is undesirable. Yet another objective is to enable the fuel in the slave tank to mix relatively quickly with the fuel with which the main tank has just been filled, once mixing starts, but only as a direct result of the fact that the lambda sensor has reached operating temperature, and can therefore begin to control the fuel injection.

In accordance with the present invention, an arrangement for supplying fuel to an internal combustion engine may include a main tank having a filler opening through which fuel may be introduced into the main tank. A slave tank is arranged to receive the fuel from the main tank, the slave tank having an overflow outlet. A fuel pump is arranged in the slave tank, the fuel pump having a suction side for drawing fuel from the slave tank and a pressure side. A feed pipe is arranged between the pressure side of the fuel pump and the fuel manifold for delivering fuel from the pressure side of the pump to the fuel manifold. An ejector having a suction side and a pressure side is arranged such that the suction side of the ejector is connected to the main tank, the ejector being connected to and being operable by the pressure side of the pump for sucking in fuel from the main tank and delivering such fuel to the pressure side of the ejector. A rising pipe is connected to the pressure side of the ejector, the a rising pipe having an outlet at a height higher than the height of the overflow outlet. In turn, the height of the overflow outlet is higher than the maximum level to which the main tank can be filled.

By arranging the rising pipe from the ejector outlet so that it discharges above the surface of the slave tank, and is located above the overflow outlet in the slave tank, and because the overflow outlet lies above a maximum level for the filling the tank with fuel, ensures that the connection is interrupted when the fuel pump stops. No fuel is able to flow back out into the main tank because of the siphon effect, and no fuel from the main tank can reach the slave tank.

In an advantageous design the flow in the ejector feed pipe can be selectively influenced according to the operation of the lambda sensor, which means that no mixing can occur before the lambda sensor has begun to operate. This prevents several short operating periods from causing the slave tank to begin mixing to form a different fuel after a cold start.

With an adequately dimensioned slave tank having a volume of a couple of liters, at least a limited number of short operating periods are allowed without the lambda sensor reaching its operating temperature during these periods, and without any difficulty in starting the engine. In this case the flow in the ejector feed pipe may, in preference, be influenced so that a valve shuts off the flow in the ejector feed pipe.

Because the fuel return pipe from the engine fuel manifold discharges into the slave tank, the slave tank will be in circulation during a cold start process before the lambda sensor has reached its operating temperature, and is only drained of fuel in proportion to the engine fuel consumption.

Other features and advantages of the present invention will become apparent from the following description of the invention which refers to the accompanying drawings.

DETAILED DESCRIPTION OF THE PREFERRED EMBODIMENT(S)

Figure 1:
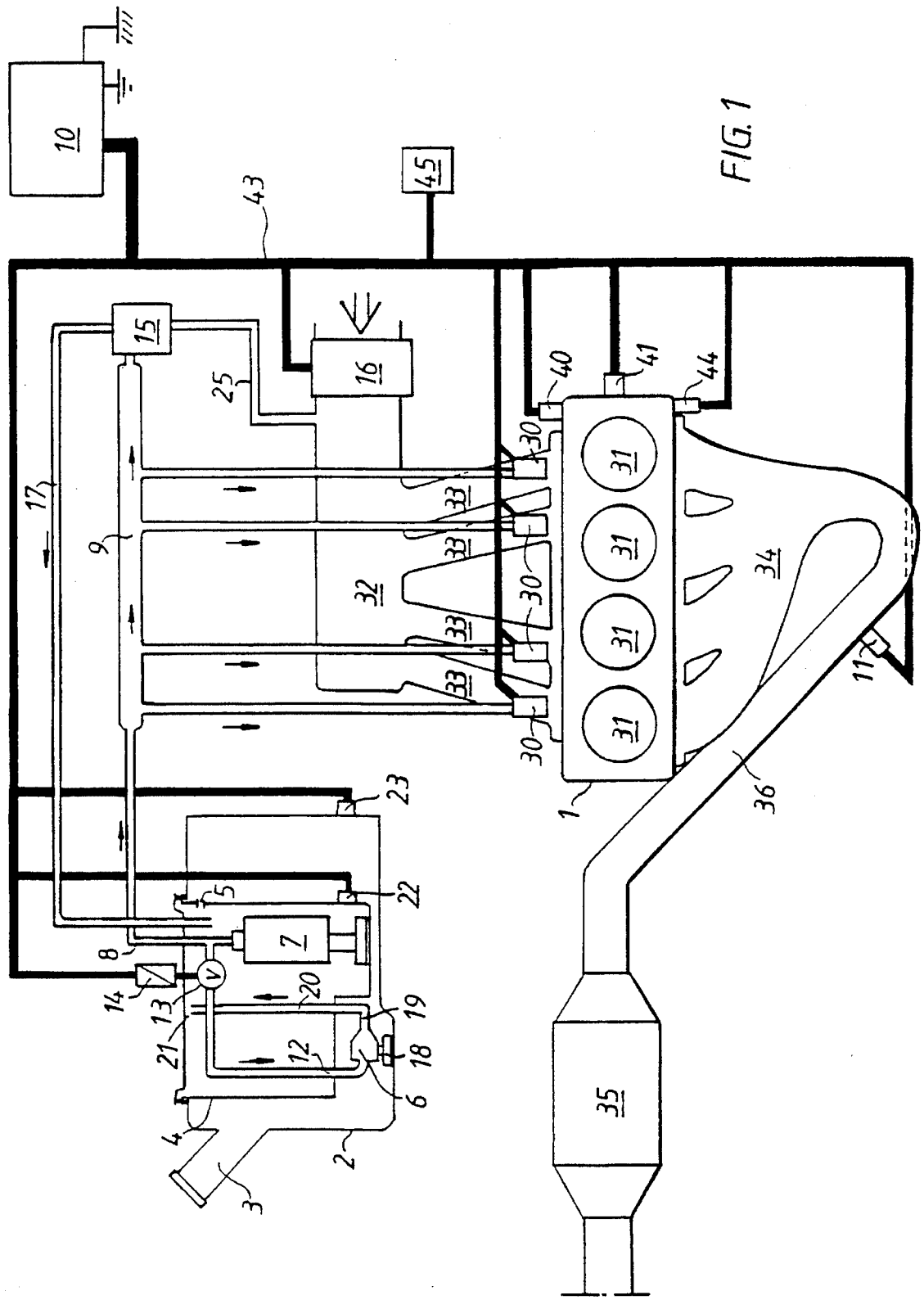
FIG. 1 shows the basic structure of the arrangement according to the invention.

FIG. 1 shows an arrangement for fuel supply to an internal combustion engine 1. A main tank 2 can be filled with fuel via a filler opening 3. A slave tank 4, which is suitably designed to hold a couple of liters, is arranged inside main tank 2. The slave tank is connected to the main tank only by an overflow outlet 5, and indirectly via an ejector 6 arranged at the bottom of main tank 2. Overflow outlet 5 is positioned at such a level that it is above the highest level which can be reached when the main tank is filled. For filling purposes the pump nozzles are provided with an automatic shutoff when the fuel reaches the nozzle, which is why the tank cannot and should not be filled with fuel to the edge of filler opening 3. The overflow outlet could otherwise be arranged at a level lying above the edge of the filler opening. Ejector 6 is driven by pressurised fuel from fuel pump 7 arranged in the slave tank. Fuel pump 7 sucks fuel from the bottom of the slave tank, thus pressurised fuel is fed via a feed line 8 to a fuel manifold 9.

Manifold 9 distributes the fuel to injectors 30, which are arranged by a method of prior art to supply the fuel cylinder by cylinder, either directly into the cylinder, or, more conventionally, indirectly via the inlet ports 33 of the respective cylinders. A sequential injection is preferably applied, the rate and injection time of which are controlled by a control unit 10, according to the operating condition of the engine. A fuel pressure governor 15, which maintains the pressure in fuel manifold 9, and feeds fuel in return pipe 17 back to slave tank 4, is also arranged on fuel manifold 9. Fuel pressure governor 15 receives control pressure via pipe 25 from intake manifold 32, so that the fuel pressure in manifold 9 is increased as the inlet pressure of the engine increases.

An electronic control unit 10 is connected by a cable network 43 to a number of sensors 11, 22, 23, 16, 40, 41, 44 and actuators 14, 30, for controlling engine 1 according to the operating parameters concerned. Input signals are received from a lambda sensor 11, level sensors in the slave tank and main tank, 22 and 23 respectively, an air mass gauge 16, an engine temperature sensor 40, a crankshaft sensor 41 and an oil pressure sensor 44. Control unit 10 can also receive input signals from an ignition system 45 for identifying the engine compression stroke.

The actuators which are controlled by the output signals from the control unit are injectors 30, arranged on each cylinder, together with valve mechanism 13, 14 for activating ejector 6.

Control unit 10 controls primarily the fuel flow rate in proportion to the amount of air drawn into cylinders 31, which is detected by air mass gauge 16. The control unit also detects the oxygen content of the exhaust gases with a lambda sensor 11, which is arranged in the exhaust system of the internal combustion engine, downstream from an exhaust gas collector 34 and upstream from a catalytic converter 35. As soon as the lambda sensor 11 has reached the operating temperature required for it to act as a detector, control unit 10 receives information on how much the fuel supplied, and controlled primarily according to the amount of air sucked in, is to be corrected to maintain optimum combustion and ensure the most favourable conditions for operation of the catalytic converter. The control unit can also detect, by means of lambda sensor 11, the mixing ratio of methanol to petrol, and on this basis correct the amount of fuel fed to the cylinders so that the correct quantity of the fuel value of the mixture concerned is received. Through different measures, such as positioning closer to the engine or electrical heating, the lambda sensor can be arranged to reach its operating temperature more quickly. Normally, however, it takes between 60–90 seconds for the catalytic converter to reach operating temperature by spontaneous heating.

Feed pipe 12 of ejector 6 is connected to feed line 8 so that a partial flow of the fuel pressurised from the pump is able to reach ejector 6. As the ejector itself acts as a throttle, maintenance of the pressure in flow pipe 8 and fuel manifold 9 is guaranteed. It is also guaranteed that a certain return flow will be maintained in fuel return pipe 17. The flow in ejector feed pipe 12 is actuated by a valve mechanism 13, which prevents the fuel from flowing to the ejector before the lambda sensor of the internal combustion engine has reached the required operating temperature. This can be achieved so that control unit 10 monitors lambda sensor 11, and when the lambda sensor comes into operation, control unit 10 activates a valve 13 which can be actuated by an electromagnet 14, so that the flow is opened. It should, preferably, be possible to actuate the valve so that it opens when the electromagnet is supplied with voltage and closes automatically when there is no electromagnet operating voltage. Ejector feed pipe 12 leads down to an ejector 6 arranged on the bottom of main tank 2. The ejector feed pipe may pass through the bottom of the slave tank via a seal, not shown, or alternatively it may pass out through the wall of the slave tank above the level of overflow outlet 5. The ejector should preferably be of a type such as that shown in detail in EP,B,305350 or WO 91/17355. Suction side 18 of the ejector is arranged at the bottom of main tank 2, and the flow from feed pipe 12 entrains fuel from the main tank to outlet 19 of the ejector. Outlet 19 of the ejector is connected to a rising pipe 20, which may pass through the bottom of the slave tank via a seal, not shown, or alternatively pass in through the wall of the slave tank above the level of overflow outlet 5. Rising pipe 21 discharges above overflow outlet 5 in slave tank 4, and this overflow outlet 5 is higher than the highest level to which the fuel can be filled in main tank 2 via filler opening 3.

When the control unit detects that lambda sensor 11 has reached the required operating temperature, mechanism 13, which actuates the flow in ejector feed pipe 12, is actuated so that the fuel begins to flow. The fuel from main tank 2 then begins to be drawn into slave tank 4, so that it is kept filled. With a sufficiently high capacity of fuel pump 7 slave tank will be kept continuously filled and will be flushed through by the fuel from main tank 2, whilst excess mixed fuel in the slave tank flows back to the main tank via overflow outlet 5. This enables the slave tank to pass quickly to a largely similar mixing ratio to that of the mixture present in the main tank, which transition takes place whilst the lambda sensor is in operation, and adaptively adjusts the fuel supply to the variation in mixing ratio in the slave tank.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. An arrangement for supplying fuel to an internal combustion engine having a fuel manifold, which arrangement comprises:

a main tank having a filler opening through which fuel may be introduced into the main tank;

a slave tank arranged to receive the fuel from the main tank, the slave tank having an overflow outlet at a predetermined height;

a fuel pump arranged in the slave tank, the fuel pump having a suction side for drawing fuel from the slave tank and a pressure side;

a feed pipe arranged between the pressure side of the fuel pump and the fuel manifold for delivering fuel from the pressure side of the pump to the fuel manifold;

an ejector having a suction side and a pressure side, the suction side of the ejector being connected to the main tank, the ejector being connected to and being operable by the pressure side of the pump for sucking in fuel from the main tank and delivering said fuel to the pressure side of the ejector; and a rising pipe connected to the pressure side of the ejector and extending vertically, the rising pipe having an outlet at a height higher than the height of the overflow outlet and the height of the overflow outlet being higher than a maximum height which the main tank can be filled.

2. An arrangement according to claim 1, wherein an ejector feed pipe is provided between the pressure side of the pump and the ejector for connecting the pressure side of the pump to the ejector and for operating the ejector by delivering pressurized fuel from the pump thereto.

3. An arrangement according to claim 2, wherein the engine has an exhaust system and a lambda sensor for detecting the oxygen content of exhaust gases passing through the exhaust system, and further including a flow influencing mechanism arranged between the pressure side of the pump and the ejector, and a control unit for actuating the flow influencing mechanism, the control unit being responsive to the lambda sensor in the exhaust system for preventing flow to the ejector until the lambda sensor has reached a predetermined operating temperature.

4. An arrangement according to claim 3, further including a return pipe connected from the fuel manifold to the slave tank.

\* \* \* \* \*